United States Patent [19]
Zitelli et al.

[11] 3,864,631
[45] Feb. 4, 1975

[54] ELECTRONIC MULTIMETER HAVING A PLURALITY OF VOLTAGE-TO-FREQUENCY CONVERTERS

[75] Inventors: William E. Zitelli, Media; Andras I. Szabo, Export, both of Pa.

[73] Assignee: Westinghouse Electric Corporation, Pittsburgh, Pa.

[22] Filed: Apr. 16, 1974

[21] Appl. No.: 461,333

[52] U.S. Cl................. 324/115, 324/99 D, 324/142
[51] Int. Cl....................... G01r 15/08, G01r 17/06
[58] Field of Search........ 324/115, 120, 140 R, 141, 324/142, 99 D

[56] References Cited
UNITED STATES PATENTS
3,718,860   2/1973   Kwast et al. .......................... 324/142

OTHER PUBLICATIONS
Bombi et al., IEEE Trans. Inst. & Meas., Vol. 19, No. 1, Feb. 1970, pp. 57–61.

*Primary Examiner*—Alfred E. Smith
*Assistant Examiner*—Ernest F. Karlsen
*Attorney, Agent, or Firm*—J. R. Hanway

[57] ABSTRACT

A multimeter suitable for indicating the ampere-squared hours, the volt-squared hours, and the watt-hours in an electrical circuit. Three separate voltage-to-frequency circuits are connected to shared timing and power supply circuits. Electrical signals corresponding to the voltage and current in the monitored electrical circuit are applied by appropriate connections to the voltage-to-frequency circuits through multiplier circuits. One multiplier circuit squares the current, another multiplier circuit squares the voltage, and still another multiplier circuit provides the product of the current and voltage to yield a power indication. Programmable dividing circuits reduce the number of pulses which are counted and displayed by the multimeter and enable the display of measured parameters in exact engineering units. An output is included for applying a digital signal responsive to the indicated quantities to a recorder or computer.

5 Claims, 3 Drawing Figures

ELECTRONIC MULTIMETER HAVING A PLURALITY OF VOLTAGE-TO-FREQUENCY CONVERTERS

BACKGROUND OF THE INVENTION

1. Field of the Invention

This invention relates, in general, to electrical apparatus and, more specifically, to apparatus for measuring electrical quantities in power distribution systems.

2. Description of the Prior Art

There are applications existing for apparatus which is responsive to slowly varying voltages. Such apparatus includes, but is not limited to, watt-hour meters for measuring the amount of energy consumed by a load or provided by a source. Although electromechanical watt-hour meters are very common, electronic watt-hour meters are desirable in some applications.

In addition to providing information concerning watt-hour quantities, it is often desirable to have information concerning the relationship between the voltage and current which determine the power. As a practical solution to the need for such information, it is desirable to have a direct reading multimeter which accurately indicates the average of the square of the current monitored, the average of a square of the voltage monitored, and the average power which is equal to the product of the monitored voltage and current. Therefore, it is desirable, and it is an object of this invention, to provide an electronic multimeter which conveniently displays these quantities.

It is often desirable to record the monitored quantities to permit retrieval of the information for further study or computation, often by means of a digital computer. The measured quantities are usually converted to suitable voltages by instrument transformers connected in the electrical circuit which is being monitored. The voltages are derived in analog form and must be converted into digital form to permit convenient recording and processing. Therefore, it is desirable, and it is another object of this invention, to provide apparatus which converts information signals in analog form to digital form for recording, processing and display.

For highly accurate measurements, the rate of pulses provided by the digital information signals is relatively large. To prevent the required use of a high-capacity counter and recorder, it is desirable to reduce the number of pulses monitored by such apparatus. Therefore, it is desirable, and it is still another object of this invention, to provide apparatus which provides highly accurate measurements over a relatively long period of time without high-capacity display and recording equipment.

SUMMARY OF THE INVENTION

There is disclosed herein a new and useful electronic multimeter which is suitable for simultaneous measurement of a plurality of electrical signals over a relatively long period of time. The multimeter is especially suitable for measuring, and processing for computer or recorder connections, electrical signals corresponding to the current, voltage and power in an electrical circuit. The multimeter includes power supplies, a timing signal generator, and signal amplifiers which are shared in common with a plurality of similar processing and counting circuits of the multimeter. One processing and counting circuit is connected to the signal amplifier which is responsive to the voltage in the circuit being monitored. The voltage responsive signal is squared and applied to a voltage-to-frequency circuit which provides pulses at a rate responsive to the average amplitude of the square of the voltage monitored. These pulses are applied to a programmable dividing circuit which provides a smaller number of pulses for counting and recording. A similar processing and counting circuit is connected to the signal amplifier which is responsive to the current in the circuit being monitored. This processing and counting circuit provides indications about the average of the square of the current monitored. Another similar processing and counting circuit is connected to both of the signal amplifiers. This processing and counting circuit provides indications about the average power monitored. The counters accumulate the indications and thus provide information about the measured quantities in relation to a period of time, such as voltage-squared hours, current-squared hours, and power hours or watt-hours.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
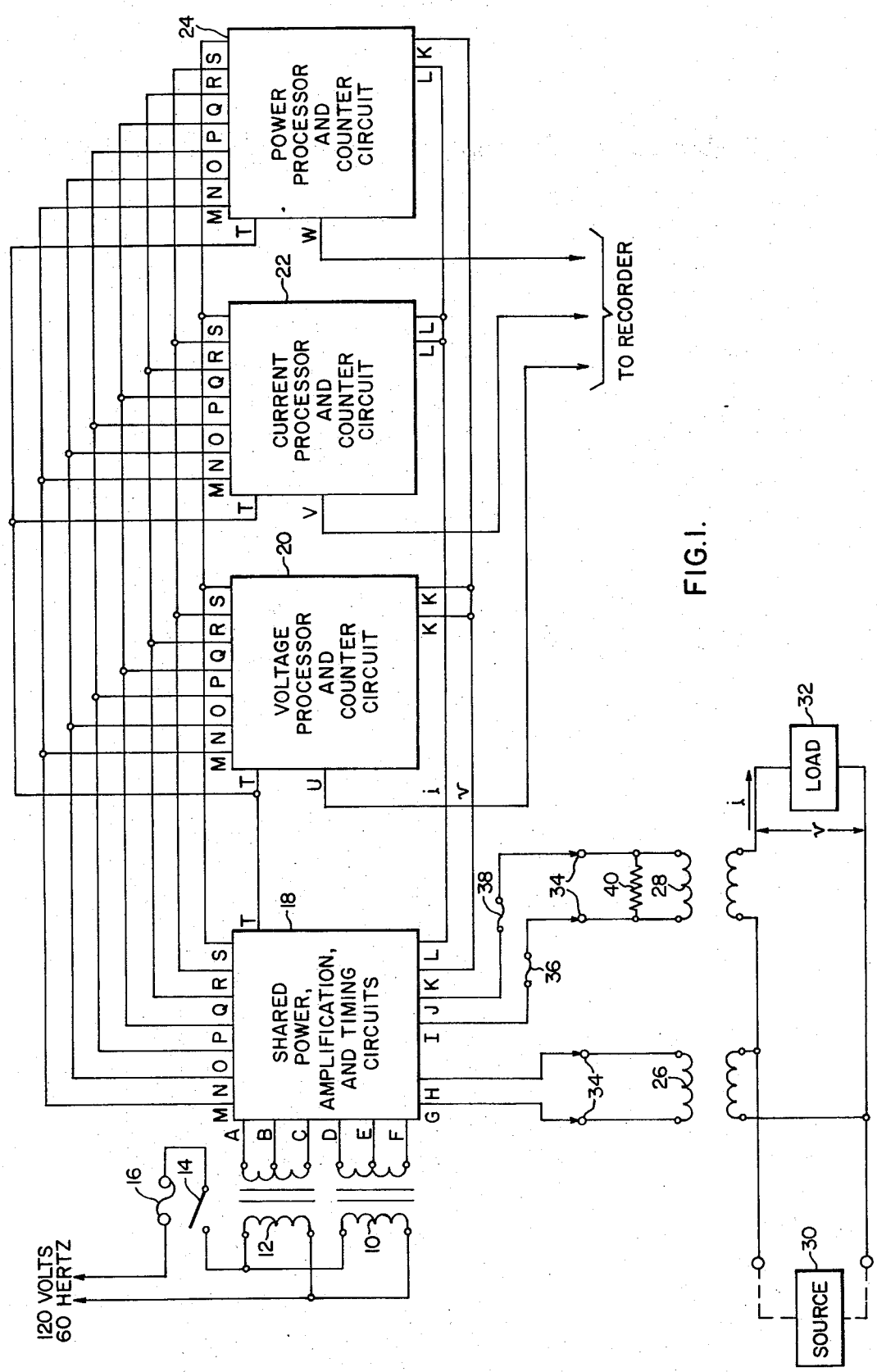
FIG. 1 is a block diagram of a multimeter constructed according to this invention.

Throughout the following description, similar reference characters refer to similar elements or members in all the figures of the drawing.

Referring to the drawing, and to FIG. 1 in particular, there is shown a schematic diagram of a multimeter constructed according to this invention. The diagram of FIG. 1 illustrates the interconnection arrangement between major components of the multimeter and the connections of the multimeter to external apparatus. Electrical power is applied to the power transformers 10 and 12 through the switch 14 and the fuse 16. The secondary windings of the transformers 10 and 12 are connected to the shared or common circuits 18 of the multimeter by the connections designated with the letters A, B, C, D, E and F. The shared circuits rectify, filter and regulate the voltage provided by the power transformers 10 and 12 to provide the necessary operating voltages for the multimeter components. The required DC voltages provided by the regulating circuits are transferred to the processor and counter circuits 20, 22 and 24 through the leads designated by the letters M, N, O, P, Q, R and S.

The shared circuits 18 are also connected to the components which furnish voltages responsive to the monitored electrical quantities. In this specific embodiment, the transformers 26 and 28 provide voltages across the leads designated by the letters G, H, I and J which are responsive to the instantaneous voltage $v$ and the instantaneous current $i$ supplied by the source 30 to the load 32. The terminals 34 indicate that the transformers 26 and 28 are usually located external to the circuits of the multimeter and may be connected thereto by appropriate contacts. The fuses 36 and 38, and the shunt resistor 40, help protect the shared circuits 18 from excessive currents developed under high load-current conditions.

The shared circuits 18 include a timing circuit which generates a timing signal which is transferred across the connection designated by the letter T to the processor and counter circuits 20, 22 and 24. The shared circuits 18 also include amplifiers which amplify the voltage signals derived from the transformers 26 and 28. These amplified signals are transferred across the connections designated by the letters K and L which are also connected to the processor and counter circuits 20, 22 and 24.

The processor and counter circuits 20, 22 and 24 are constructd similar to each other and respond to the signals applied to their respective input terminals to provide the desired output signal. Each processor and counter circuit includes two inputs which are effectively multiplied together to yield the desired output quantity. In the voltage processor and counter 20, both inputs are connected to the connection which transfers the amplified voltage signal. Thus, the circuit 20 provides, with suitable internal processing, a signal which corresponds to the average of the squared voltage. This signal is displayed by a counting circuit and is also transferred by the connection designated with the letter U to a recorder which may record the signals for future reference and processing. The two inputs of the circuit 22 are each connected to the connection which transfers the amplified current signal. Thus, the circuit 22 provides a signal corresponding to the average of the squared current flowing through the load 32. This signal is applied to a recorder through the connection designated by the letter V. The circuit 24 has one input terminal connected to the voltage connection and the other input terminal connected to the current connection. Thus, the product of the voltage and the current provided by the circuit 24 is indicative of the average power consumed by the load 32. A signal corresponding to this information is also transferred to the recorder by connection W.

Figure 2:
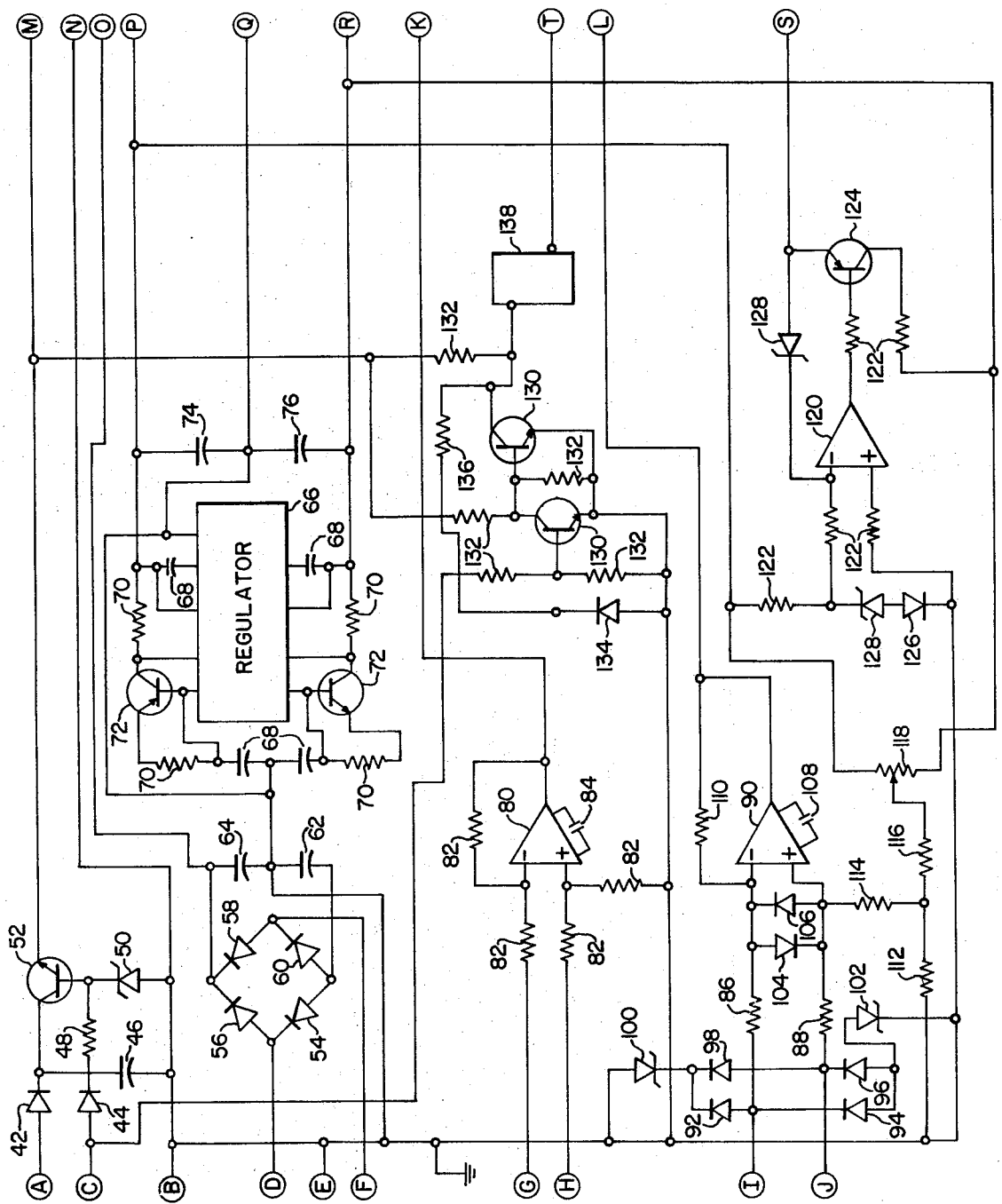
FIG. 2 is a schematic diagram of the shared circuits contained in the multimeter; and, FIG. 3 is a schematic diagram of the processing and counter circuits shown in FIG. 1.

FIG. 2 is a schematic diagram of the shared circuit 18 contained in the multimeter. The letters designated at the terminals in FIG. 2 correspond to the letter designations for the connections shown in FIG. 1. Referring to both FIGS. 1 and 2, the voltage from the power transformer 12 is full-wave rectified by the diodes 42 and 44. This rectified voltage is filtered and regulated by the capacitor 46, the resistor 48, the Zener diode 50, and the power transistor 52. This provides a regulated +5 volts at terminal M for the logic and transistor stages of the multimeter.

The bridge rectifier containing the diodes 54, 56, 58 and 60 full-wave rectifies the voltage from the power transfomer 10 to provide a +15 volts at terminal P and a −15 volts at terminal R, both with respect to terminal Q which is at ground potential. The filter capacitors 62 and 64 help filter the rectified voltage for application to the regulating circuit. The regulating circuit includes the integrated circuit 66 and the associated capacitors 68, resistors 70, and transistors 72, Additional filtering is supplied by the output capacitors 74 and 76. Although other filter circuit arrangements may be used within the contemplation of this invention, the circuit illustrated in FIG. 2 may be used with an SG1501 integrated circuit to provide the desired voltage and regulating characteristics. The terminal designated by the letter O is connected to the unregulated rectified voltage to provide such a voltage to various components in the processor and counter circuits of the multimeter.

The voltage from the potential transformer 26 is applied through the terminals designated by the letters G and H to the inverting and non-inverting terminals of the operational amplifier 80. The operational amplifier 80 cooperates with the resistors 82 and the capacitor 84 to condition the voltage signals applied thereto and to provide the conditioned signal to the terminal designated by the letter K.

The voltage from the current transformer 28 is applied to the terminals designated by the letter I and J. This voltage is transferred, through the resistors 86 and 88, to the inverting and non-inverting terminals of the operational amplifier 90. The clamping diodes 92, 94, 96 and 98, and the Zener diodes 100 and 102 provide protection for the operational amplifier against excessively high input voltages with respect to ground from the current transformer 28. The clamping diodes 104 and 106 provide protection for the operational amplifier 90 against excessive voltages developed across the current transformer 28. The capacitor 108 and the resistor 110 cooperate with the operational amplifier 90 to suitably condition the voltage signal generated by the current transformer 28 and to apply the conditioned signal to the terminal designated by the letter L. The network containing the resistors 112, 114 and 116 and the potentiometer 118 provides a means for adjusting the offset voltage of the operational amplifier 90 to the desired value.

Particular portions of the multimeter require an extremely accurate reference voltage for accurate operation. The regulated plus and −15 volts is applied to the regulating stage comprising the operational amplifier 120, the resistors 122, the transistor 124, the diode 126, and the Zener diodes 128. This regulating network provides a highly accurate −9 volts to the terminal designated by the letter S.

Some of the circuits of the multimeter also require the application of a highly accurate timing pulse to trigger various components in the multimeter. The timing pulse required consists of a uniform duty cycle square-wave having 30 pulses per second. The alternating voltage provided at terminal C is applied to the network containing the transistors 130, the resistors 132, and the diode 134. The high impedance positive feedback resistor 136 helps to speed-up the edges of the pulsed waveform while insuring clean waveforms with the addition of hysteresis. The filpflop 138 divides the 60 hertz frequency by two and provides the desired square-wave output to the terminal designated by the letter T.

Figure 3:
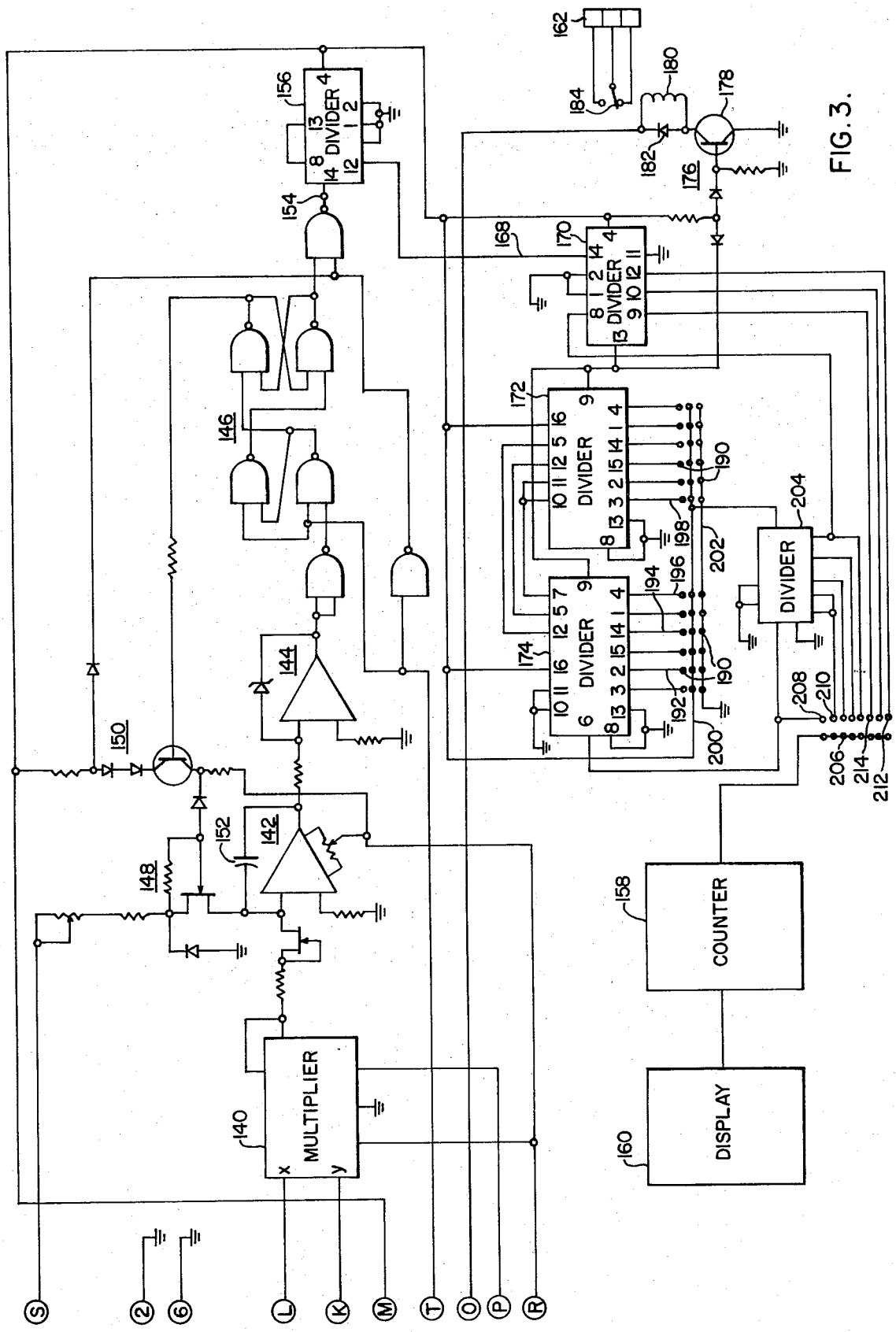

Each of the circuits 20, 22 and 24 shown in block form in FIG. 1 has substantially the same arrangement. FIG. 3 is a schematic diagram of a circuit suitable for use as the power processor and counter circuit 24. The component arrangement for the circuits 20 and 22 would be similar; however, the signal to which the input terminals are connected would be different and the significance of the output signal therefrom would be different from that of the circuit used for the power processor and counter circuit 24.

In FIG. 3, the amplified voltage signals corresponding to the monitored voltage and current are applied through the terminals L and K to the multiplier circuit 140. The multiplier 140 accepts signals at its input terminals x and y and multiplies these signals together to produce the result at its output terminal. Integrated circuits are commercially available to provide this function. The signal and power connections illustrated in FIG. 3 for the multiplier 140 are those which would normally be used when the multiplier 140 is an Intronics type M310 integrated circuit.

The output of the multiplier 140 is proportional to the power in the monitored system, since the quantities multiplied are the voltage and the current of the monitored system. The signal corresponding to the power is applied to circuitry which forms a voltage-to-frequency converter which produces voltage pulses at a rate or frequency corresponding to the amount of the voltage applied thereto. The voltage-to-frequency converter system consist essentially of an integrator 142, a comparator 144, decision control logic 146, a discharge command circuit 150, and a switching circuit 148. The operation of a similar voltage-to-frequency converter system is described in detail in U.S. Pat. No. 3,778,794, which is assigned to the assignee of this invention.

Briefly, the voltage-to-frequency converter system works on the basic principle of balancing the charge in the capacitor 152. The input signal causes the charge on the capacitor 152 to increase to a predetermined level at which a decision is made to remove some charge from the capacitor 152. Charge is removed from the capacitor when the decision is made by the control logic 146 and a suitable signal is applied through the discharge command circuit 150 to the switching circuit 148. The switching circuit 148 is turned on during the discharge interval and drains charge from the capacitor 152. The charge is removed from the capacitor 152 in a quantized manner until it falls below the reference level. The discrete number of times the charge is removed is equal to the number of pulses emitted, which is directly proportional to the input signal. In other words, the charge on the capacitor 152 is maintained at a predetermined level by removing charge therefrom in short pulses of equal duration. The larger the signal, the greater the number of pulses required to remove enough charge from the capacitor 152 to maintain a constant voltage thereon.

The pulses existing at the output of the voltage-to-frequency converter system are transferred at the terminal 154 to the divider 156. Since the pulses existing at the terminal 154 in FIG. 3 are in a fixed time reference, the average of the monitored quantity is indicated by counting the pulses. For example, with voltage and current inputs, the output at connection 154 indicates the average power. With both current inputs, the output would indicate the average of the current squared and with both voltage inputs, the output would indicate the average of the voltage squared. In addition, by counting the pulses over a period of time, the quantity measured becomes one which is related to time, such as watt-hours when voltage and current inputs are applied to the multiplier 140. To determine the total number of watt-hours, the pulses are counted over a period of time by suitable apparatus. The apparatus shown in FIG. 3 includes a counter 158 and a corresponding display 160 which gives a continuous indication of the watt-hours measured.

Dividing circuitry is used in the multimeter to reduce the number of pulses counted by the counter 158 and the number of pulses monitored by a recorder connected to the terminals 162. The divider 156 divides the signal by sixteen according to this specific embodiment of the invention. The connections to the designated terminal numbers of the divider 156 are those required for a 74L93 integrated circuit logic stage to provide the divide-by-sixteen function. The output from the divider 156 is applied through the connection 168 to the divider 170. The divider 170 divides this signal by two before applying it to the dividers 172 and 174 and to the recorder pulsing circuitry 176. The terminal connections illustrated for the divider 170 are those which would be used with an integrated circuit similar to the one described for use in the divider 156. The pulsed signal, which is divided by thirty-two by the time it reaches the recorder pulsing circuit 176, triggers the switching transistor 178 which energizes the reed relay 180 which is clamped by the diode 182. The contact structure 184 of the reed relay 180 opens and closes according to the pulse rate applied to the circuit 176. By switching a suitable signal with the contacts 184 and by applying the signal to a recorder, the number of pulses provided by the voltage-to-frequency converter system can be recorded and studied at a later time. In addition, the relay contacts may be used for connection to a computer which can be programmed to perform various functions in response to the measured data.

The dividers 170, 172 and 174 are connected in an arrangement which permits flexibility in determining the overall ratio by which the pulses at the terminal 154 will be divided before being counted by the counter 158. The dividers 172 and 174 are binary coded dividers which may be programmed to provide a division by any number between approximately one and 4,096. The dividers 172 and 174 are available commercially in an integrated circuit with the type designation SN7497. The terminal connections for this type of integrated circuit divider are shown in FIG. 3.

The programming of the dividers 172 and 174 is accomplished by connecting suitable jumpers between the programming terminals 190 of the dividers 172 and 174. In effect, the programming of the dividers 172 and 174 consist of properly connecting the programmable terminals 190 of the dividers 172 and 174 with the proper tubular digit binary number which represents the desired number of times the circuits are to divide the pulses. For example, if it is desired to divide the pulses, with the dividers 172 and 174, by the number then the corresponding tubular digit binary number 010101100000 must be programmed into the dividers. This would be done by connecting a jumper between the terminals connected to the leads 192, 194, 196 and 198 to the "Hi" logic state furnished by the connection 200. The remaining terminals of the dividers would be connected to the "Lo" furnished by the connection 202. Any other arrangement of programming the dividers 172 and 174 by other jumper arrangements provides a different number by which the pulses are divided.

Additional division of the pulses is provided by the divider 204 and by portions of the divider 170. The terminal designations and the connections illustrated in this specific embodiment of the invention are typical of those used when the dividers consist of a type 74L93 integrated circuit. When the connection 206 is connected by a suitable jumper to the terminal 208, no additional division is provided by the dividers 204 and 170. When the connection 206 is connected to the terminal 210, an additional division by two is accomplished. Connection to each of the other terminals provides additonal division by a factor of two down to a total of 128 at terminal 212. For example, with the connection 206 connected to the terminal 214, the extra division provided by the dividers 204 and 170 is equal to 32. The divided pulse rate is counted by the counter 158 and indicated by the display 160. Thus, the multimeter furnishes a continuous indication of the watt-hours being consumed by the load monitored. By using circuits similar to that shown in FIG. 3, the voltage-squared hours and the current-squared hours can be indicated. The dividing networks of the multimeter are selected to make the indications provided correspond with the quantities measured. For example, if one watt-hour produces 1,000 pulses per hour, and the first digit on the display represented one watt-hour, the dividing network would be programmed to divide the pulses from the terminal 154 by 1,000.

Since numerous changes may be made in the above-described apparatus, and since different embodiments of the invention may be made without departing from the spirit thereof, it is intended that all of the matter contained in the foregoing description, or shown in the accompanying drawing, shall be interpreted as illustrative rather than limiting.

I claim as my invention:

1. A multimeter for measuring first and second electrical signals, comprising:

a timing signal generator;

first and second input circuits which respectively transfer the first and second electrical signals;

first and second multiplier circuits each having two inputs and an output which is responsive to the product of the signals applied to the inputs, with the inputs of said first and second multiplier circuits being appropriately coupled to the first and second input circuits to provide the desired output products;

a first voltage-to-frequency converter connected to the output of said first multiplier circuit and to said timing signal generator, said converter providing output pulses proportional in number to the output from said first multiplier circuit;

a first programmable electronic dividing circuit connected to said first voltage-to-frequency converter, said dividing circuit providing one output pulse when the output pulse from said voltage-to-frequency converter occurs a predetermined number of times;

first counter and first display means which furnish an indication of the number of output pulses provided by the dividing circuit;

a second voltage-to-frequency converter connected to the output of said second multiplier circuit and to said timing signal generator, said converter providing output pulses proportional in number to the output from said second multiplier circuit;

a second programmable electronic dividing circuit connected to said second voltage-to-frequency converter, said dividing circuit providing one output pulse when the output pulse from said voltage-to-frequency converter occurs a predetermined number of times; and, second counter and second display means which furnish an indication of the number of output pulses provided by the second dividing circuit.

2. The multimeter of claim 1 wherein the first and second voltage-to-frequency converters each include an integrating circuit having a capacitor which is charged by the input signal to the integrating circuit, a discharge circuit connected to said capacitor for discharging said capacitor, a control circuit responsive to the charge on the capacitor, said control circuit activating the discharge circuit to remove charge from the capacitor when the charge is above a predetermined level, said charge being removed in equal amounts by discharge pulses of equal duration, with the number of pulses required to maintain the predetermined level of charge on the capacitor responsive to the amplitude of the input signal to the voltage-to-frequency converter.

3. The multimeter of claim 1 wherein the first and second programmable dividing circuits each are at least partially programmed by connecting terminals thereof to "Hi" and "Lo" state logic terminals by suitable jumpers to apply a binary number to the dividing circuits, with the decimal equivalent of the binary number being equal to the division ratio of at least part of the each dividing circuit.

4. The multimeter of claim 1 wherein the multimeter includes a third multiplier circuit constructed similar to the first and second multiplier circuits, a third voltage-to-frequency converter constructed similar to the first and second voltage-to-frequency converters, a third dividing circuit constructed similar to the first and second dividing circuits, a third counter and a third display means constructed similar to the first and second counter and display means, with one input of the first and third multiplier circuits connected to the first input circuit, the other input of the first multiplier circuit also connected to the first input circuit, and with both inputs of the second multiplier circuit and the other input of the third multiplier circuit connected to the second input circuit.

5. The multimeter of claim 1 wherein the multimeter includes means for attaching a recorder to the multimeter to record pulses responsive to the voltage-to-frequency converters.

* * * * *